(12) United States Patent
Chang

(10) Patent No.: US 9,402,474 B2
(45) Date of Patent: Aug. 2, 2016

(54) ARTICLE OF FURNITURE HAVING BARBED FASTENERS FOR CONNECTING COMPONENTS

(71) Applicant: Chien-Kuo Chang, Taichung (TW)

(72) Inventor: Chien-Kuo Chang, Taichung (TW)

( * ) Notice: Subject to any disclaimer, the term of this patent is extended or adjusted under 35 U.S.C. 154(b) by 71 days.

(21) Appl. No.: 14/447,709

(22) Filed: Jul. 31, 2014

(65) Prior Publication Data

US 2016/0032955 A1     Feb. 4, 2016

(51) Int. Cl.
| | | |
|---|---|---|
| *A47B 88/00* | (2006.01) | |
| *F16B 12/20* | (2006.01) | |
| *F16B 12/24* | (2006.01) | |
| *F16B 21/08* | (2006.01) | |
| *F16B 5/06* | (2006.01) | |
| *F16B 13/08* | (2006.01) | |

(52) U.S. Cl.
CPC ......... *A47B 88/0014* (2013.01); *A47B 88/0055* (2013.01); *F16B 12/20* (2013.01); *F16B 12/24* (2013.01); *F16B 21/084* (2013.01); *A47B 2088/0037* (2013.01); *F16B 5/0614* (2013.01); *F16B 13/0833* (2013.01)

(58) Field of Classification Search
CPC ............... A47B 88/0014; A47B 2088/004; A47B 2088/0037; A47B 88/0055; A47B 2088/0062; Y10T 403/4602; Y10T 403/75; F16B 12/2009; F16B 21/125; F16B 12/20; F16B 21/084; F16B 12/24; F16B 5/0614; F16B 13/0833; Y10S 403/12
USPC ............. 312/348.2, 348.1, 263, 348.4, 265.5, 312/257.1; 403/408.1, 315, 231; 411/520, 411/104
See application file for complete search history.

(56) References Cited

U.S. PATENT DOCUMENTS

| | | | | | |
|---|---|---|---|---|---|
| 4,131,376 | A * | 12/1978 | Busse | ................. | F16B 12/2036 312/263 |
| 4,353,663 | A * | 10/1982 | Glickman | ............... | F16B 12/20 403/230 |
| 4,880,284 | A * | 11/1989 | Dickson | ................. | A47B 67/04 312/257.1 |
| 4,923,321 | A * | 5/1990 | Kriz | ...................... | A47B 88/00 403/231 |
| 5,226,808 | A * | 7/1993 | Harley | ............... | A47B 88/0014 411/340 |
| 5,290,131 | A * | 3/1994 | Henriksen | ............. | F16B 37/145 411/180 |
| 5,375,923 | A * | 12/1994 | Hall | .................. | A47B 88/0055 312/330.1 |
| 5,661,936 | A * | 9/1997 | Ellingson | ............... | A47B 95/04 403/295 |
| 5,672,038 | A * | 9/1997 | Eaton | ...................... | F16B 15/06 411/508 |
| 6,478,518 | B1 * | 11/2002 | Hwang | ................... | F16B 12/14 411/104 |
| 7,223,045 | B2 * | 5/2007 | Migli | ................. | F16B 12/2009 29/452 |
| 7,341,395 | B2 * | 3/2008 | Tseng | .................... | F16B 12/26 403/231 |
| 7,891,926 | B2 * | 2/2011 | Jackson, Jr. | ........... | F16B 21/084 411/510 |
| 8,162,559 | B2 * | 4/2012 | Krige | ................. | A47B 47/0025 108/193 |
| 8,714,863 | B2 * | 5/2014 | Vallance | ............. | F16B 12/2036 403/245 |
| 2003/0155847 | A1 * | 8/2003 | Henkel | .................. | A47B 67/04 312/257.1 |
| 2007/0127984 | A1 * | 6/2007 | Kuo | ....................... | F16B 5/065 403/408.1 |

* cited by examiner

*Primary Examiner* — Daniel J Troy
*Assistant Examiner* — Hiwot Tefera
(74) *Attorney, Agent, or Firm* — Coats and Bennett PLLC

(57) ABSTRACT

An article of furniture wherein two or more components of the article of furniture are connected by a barbed fastener that extends through bores formed in the components. Barbs project from the fasteners and engage an outer surface of the bores to prevent the fastener from backing out of the bores.

6 Claims, 4 Drawing Sheets

ARTICLE OF FURNITURE HAVING BARBED FASTENERS FOR CONNECTING COMPONENTS

FIELD OF THE INVENTION

The present invention relates to furniture designs and manufacturing, and more particularly to various articles of furniture having multiple panels or components where the multiple panels or components are connected together by fasteners.

BACKGROUND OF THE INVENTION

There are many advantages to ready-to-assemble furniture. Furniture is manufactured all over the world and must be shipped to destinations throughout the world. Shipping costs are significant and manufacturers of furniture continue to try to reduce shipping costs. One way of reducing shipping costs is to design furniture such that it can be shipped disassembled. In these cases, the furniture is assembled by the consumer, a distributor, a retailer or other third party located in the destination country. The reason, of course, that disassembled furniture is more economical to ship is that greater quantities of the furniture can be placed in a shipping container.

Designing and manufacturing ready-to-assemble furniture, however, is challenging. First, it is important that the designs still retain a high level of esthetic appeal. Also, it is important that ready-to-assemble furniture be designed such that assembly is relatively easy. Also, it is important that, once assembled, the article of furniture be strong and sturdy. Both the ease of assembly and the strength and sturdiness of the article of furniture depend in significant part on the design of the fasteners used. In many ready-to-assemble furniture pieces, the fasteners used to connect components together are difficult to use and in some cases prone to become frail over time.

SUMMARY OF THE INVENTION

The present invention relates to a fastener for securing components of ready-to-assemble furniture together. The fastener of the present invention is easy to install and provides a substantial and lasting connection between components of an article of furniture. In one embodiment, the fastener includes an elongated shank having a head. A series of barbs project outwardly from the shank and are angled towards the head. When inserted into a pair of bores or openings formed in two furniture components, the barbs project into the surfaces of the bores or openings. The engagement of the barbs with the outer surfaces of the bores or openings prevents the fastener from inadvertently becoming disengaged with the bores and causing the connection to fail.

In one embodiment, the fastener is provided with a clip that is secured around the shank between at least two barbs. The clip is inserted onto the shank once the fastener has been inserted into the bores associated with the two components being connected together by the fastener. To achieve this, a lateral bore is provided in one of the components where the lateral bore intersects with the bore that receives the shank of the fastener. The clip can be inserted onto the shank by inserting the clip through the lateral bore onto the shank of the fastener. The presence of the clip secured on the shank between at least two parts adds further security and makes it more difficult for the fastener to be disengaged.

In one embodiment, for example, a series of the fasteners are used to secure panels of a drawer together. In this example, the drawer includes two side panels that are secured to front and rear panels. The fasteners are inserted from the outside through bores that extend through the sides and into the front and rear panels. The fasteners are hand inserted or driven into the bores so as to secure the two sides to the front and rear panels of the drawer.

Other objects and advantages of the present invention will become apparent and obvious from a study of the following description and the accompanying drawings which are merely illustrative of such invention.

DESCRIPTION OF EXEMPLARY EMBODIMENTS

With further reference to the drawings, the fastener of the present invention is shown therein and indicated generally by the numeral 10. Fastener 10 can be employed to connect various structures or components together. In one embodiment, the fastener 10 is specifically designed to connect furniture panels or components together such as in the case of ready-to-assemble furniture. Fastener 10 can be constructed of various suitable materials such as metal, plastic, etc. The fastener 10 is designed such that it can be hand-inserted into bores or openings formed in panels or components to be connected. In addition, the fastener 10 can be hammered or forced into and through these bores or openings. The terms "bore" and "opening" are used herein interchangeably to mean an opening for receiving the fastener of the present invention.

Figure 1:
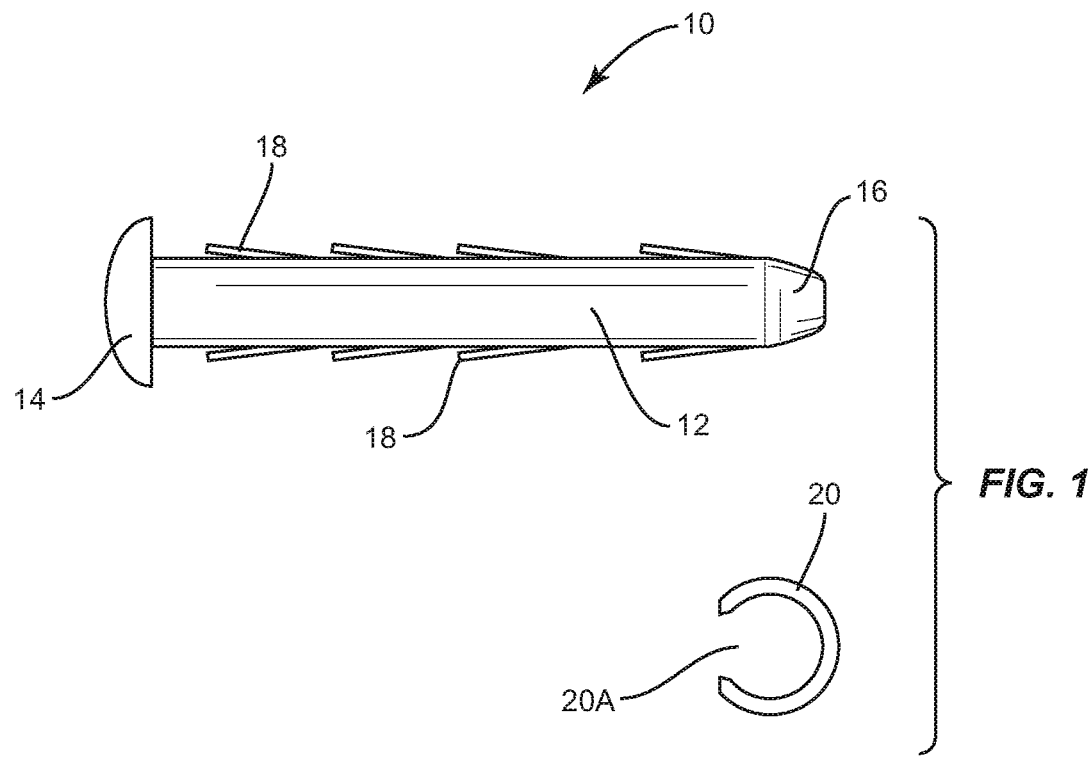
FIG. 1 is a view that illustrates the fastener of the present invention.
Figure 2:
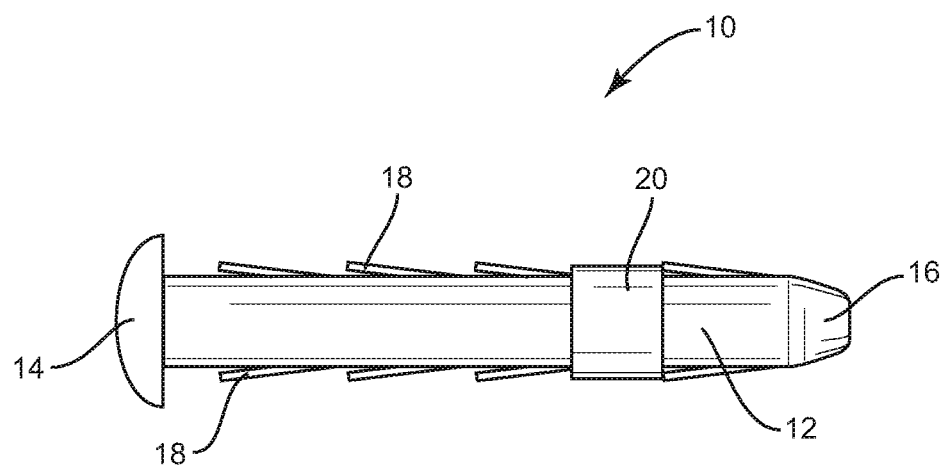
FIG. 2 is a side elevational view of the fastener of the present invention showing the clip secured to the shank of the fastener.

Viewing fastener 10 in more detail, it is seen that the same includes an elongated shank 12. Disposed on one end of the shank 12 is a head 14. The opposite end of the shank 12 forms what is referred to as an insert end 16. It will be noted from the drawings that the insert end of the shank 12 has a diameter that is less than the main body diameter of the shank 12. See FIGS. 1 and 2.

Secured or formed on the shank 12 is a series of barbs 18. Barbs 18 project outwardly from the shank and are angled towards the head 14. Note that the barbs 18 are angled at an acute angle and in the case of the embodiment illustrated herein, the barbs point generally in the direction of the head 14. It should be appreciated, however, that the angle of the barbs 18 can vary to some degree. As noted above, the angle of the barbs 18 in the embodiment illustrated herein is a relatively small acute angle. It should also be pointed out that the barbs in one embodiment are designed such that the outer ends can at least slightly flex. This facilitates inserting the fastener 12 into bores and openings and further the flexing of the barbs enables them to spring back and engage the outer surfaces of the openings or bores through which they extend. Thus, the barbs 18 tend to retain and hold the fastener 10 in place.

In the embodiment illustrated, the fastener 10 includes two rows of barbs 18. Note that each row of barbs includes a series of spaced apart barbs that extend from the lower portion of the fastener 10 to an upper portion of the fastener 10. In the case of the illustrated example, there are two rows of barbs, one on each side of the shank 12. The shape of the barbs 18 can vary. In the exemplary embodiment shown herein, the barbs 18 assume a generally rectangular shape and include a blunt outer end.

The fastener 10 also includes an associated clip 20. Clip 20 is designed to be inserted on the shank 12 between at least two barbs 18. See FIGS. 2 and 4C. Clip 20 assumes a generally cylindrical shape and includes a sleeve that is formed by a curved wall structure. The curved wall structure includes a cutout of 20A formed in the wall. In the exemplary embodiment disclosed herein, the cutout 20 includes a width that is less than the main diameter of shank 12. Thus, when the clip 20 is inserted onto the shank 12, it follows that the cutout 20A expands as the clip is pushed over the shank 12. Once the major part of the diameter of the shank 12 is cleared, the cutout 20A closes around the shank so as to retain the clip 20 on the shank. As seen in the drawings, when the clip 20 is inserted on the shank 12, the clip is disposed between two pair of barbs 18.

The dimensions of the fastener 10 can vary. However, it may be beneficial to briefly describe some exemplary dimensions. In one embodiment, the shank 12 includes a length of 37.1 mm, a diameter at the largest section of the shank of 5 mm, and a diameter of the shank at the insert end of 3.2 mm. The diameter of the head is 9 mm and the height of the head is 2.5 mm. The span across opposed barbs is 6.5 mm. With respect to the clip 20, the inside diameter of this exemplary design is 5 mm. The height or length of the clip is 5 mm and the width of the cutout is 2.9 mm. Again, as noted above, the fastener 10 can be various sizes, depending on the application and the type of materials that constitute the panels or the components being connected.

The fastener 10 can be used to connect various components of different structures together. It is particularly useful in connecting and securing together furniture panels and components. For example, the fastener 10 can be utilized to connect the sides of a furniture pieces to front, back, top and bottom panels. In an exemplary embodiment discussed below, the fastener 10 is employed to connect the sides of a drawing assembly to front and back panels.

In any event, in the way of a general description, to employ the fastener 10 of the present invention to connect two panels, for example, together there is provided a bore or opening in each of the panels to be connected. The bore or opening is particularly sized to receive the fastener 10 in such a way that once the fastener is inserted into the bores or openings that the barbs 18 will prevent the withdrawal or backing out of the fastener. This means that in one embodiment that the diameter of the bores would be slightly less than the overall diameter of the fastener including the span across opposing barbs 18. This means that when the fastener 10 is inserted through the aligned bores that the barbs may slightly flex in order to pass through the bores. However, the barbs, because of their angular orientation with respect to the axis of the shank, will engage the outer surface of the bores and prevent the fastener 10 from backing out of the bores. Thus, securing the components or panels together, the bores are aligned and the fastener is inserted through the two bores while the panels or components are abutted against each other. As noted above, the fastener 10 can be inserted by hand or driven into place with a hammer or mallet.

In some embodiments, the clip 20 may not be required. If required, a lateral bore is provided in one of the panels or the components in order to enable the clip to be inserted from the side onto the shank 12 of the fastener 10. Note that the lateral bore aligns and intersects with the main bore in that particular panel or component. Once inserted onto the shank 12, the clip 20 in this embodiment is disposed between two pairs of barbs 18. Thus the clip 20 is wedged onto the shank 12 and into the bore housing the fastener and this adds additional security and strength to the connection and makes it more difficult for the fastener 10 to inadvertently back out of the two main bores housing the fastener.

Figure 3:
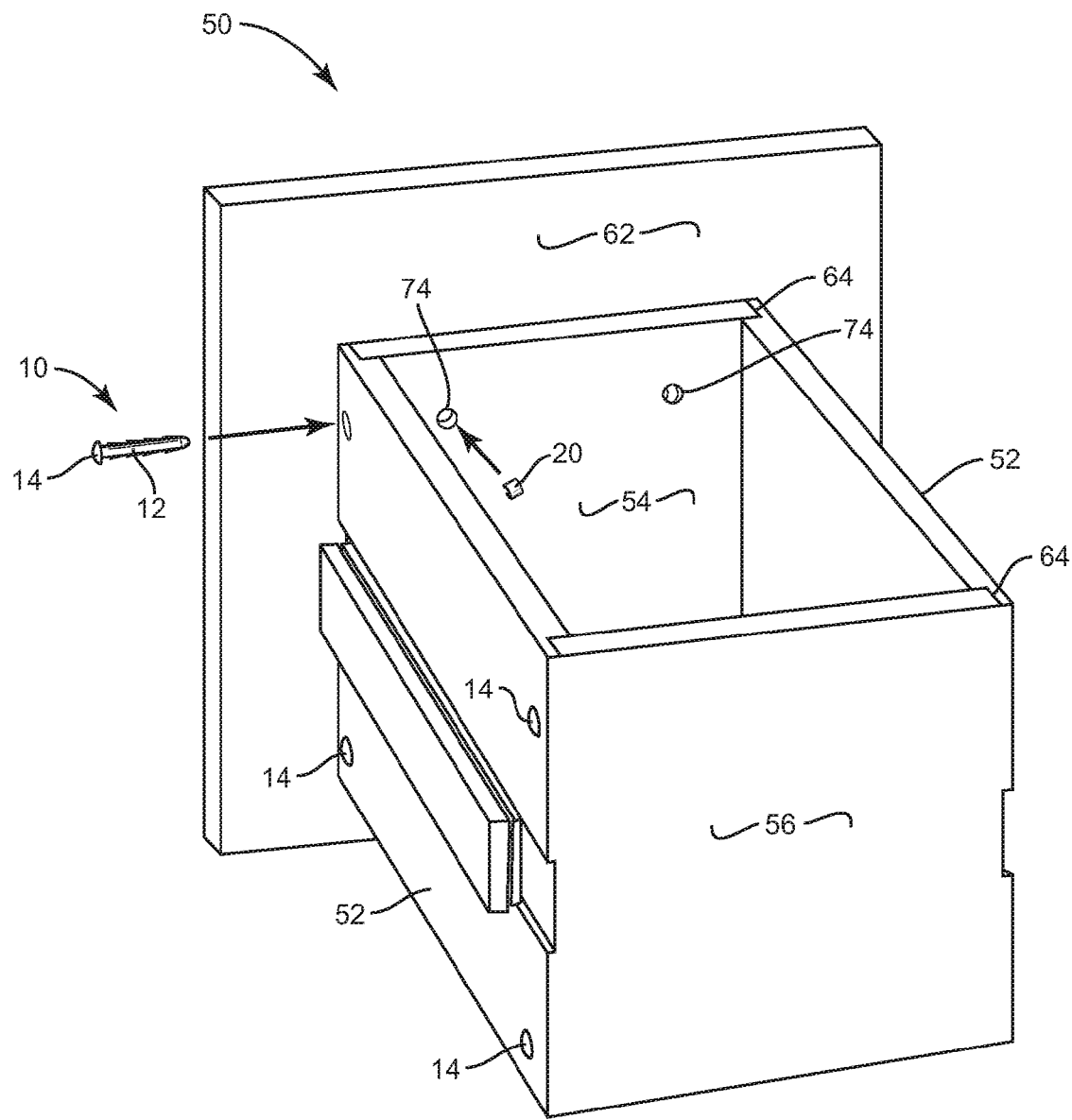
FIG. 3 is a perspective view of a drawer assembly that incorporates the fastener of the present invention.

With further reference to the drawings, a drawer assembly is shown in FIG. 3. The drawer assembly is indicated generally by the numeral 50 and incorporates the fasteners 10, shown in FIGS. 1 and 2 and discussed above. As will be discussed below, a series of the fasteners 10 are utilized to secure the sides of the drawer assembly to the front and back panels.

Before discussing how the fasteners 10 are employed, the basic structure of the drawer assembly 50 will be discussed. The drawer assembly 50 comprises a basic box frame having a pair of sides 52, a front panel 54, a back panel 56, and a bottom. A slide assembly is mounted to the exterior of each side 52. The slide assembly is a conventional device that mounts to a frame structure that in turn supports the drawer assembly. The slide assemblies enable the drawer assembly to be extended and retracted back into the frame structure or cabinet in a conventional fashion. Secured to the front panel 54 is a face panel 62. Face panel 62 includes an outer surface that may form a decorative façade.

The various components of the drawer assembly can be secured together in various conventional ways. For example, the back panel 56 may be secured to the bottom which can be adapted to be inserted into opposed grooves or elongated slots formed on the lower inner surface of the sides 52. This is simply an example of how the back panel 56 may be secured to the bottom and how the bottom can in turn be secured to the sides 52. In any event, as discussed above, the sides 52 are secured to the front and back panels 54 and 56 with a series of fasteners 10.

Each side 52 includes a vertical cutout 64 that is formed along the front and rear edges of the side. Note that the vertical cutout 64 appears on the inner surface of each side 52. The front and back panels 54 and 56 abut these vertical cutouts 64. That is, the front and back panels 54 and 56 fit into the vertical cutout 64 as shown in FIG. 3.

For purposes of explanation, one joint and the manner of connection will be described. In particular, a joint formed by one side 52 and the front panel 54 will be discussed. As noted above, the front panel 54 includes an outer vertical edge that is abutted into the vertical cutout 64 of one side. See FIG. 3. Before the side 52 and front panel 54 are aligned, a number of bores or openings are formed in the side and front panel. See FIGS. 4A-4C. First there is a bore 70 formed in the side 52. In particular, the bore 70 is aligned with the vertical cutout 64. As noted above, the bores that are formed are particularly sized to appropriately receive and accommodate the fastener 10. Another bore, bore 72, is formed in one edge of the front panel 54. Bore 72 extends a selected length into the front panel 54. A lateral bore 74 is formed in the side of the front panel 54. In particular, the lateral bore 74 extends into the front panel and intersects with the main bore 72. The spacing of the lateral bore 74 from the adjacent edge of the front panel is selected such that the clip 20 can be inserted through the lateral bore 74 onto the shank 12 of the fastener 10.

To secure the side 52 to one edge of the front panel 54, the main bores 70 and 72 are aligned. The fastener 10 is inserted from the outer surface of the side 52 through the bore 70 and into and through the bore 72. See FIGS. 4A-4C. The bores are sized such that the fastener 10 can be pushed in with one's hand or, in the alternative, can be hammered or forced into and through the bores 70 and 72. The fastener 10 is pushed and inserted into the bores 70 and 72 until the base of the head 14 engages the exterior surface of the side 52. At this point, the lateral bore 74 is aligned with a section of the shank 12 that lies between two pairs of the barbs 18. The clip is pushed through the lateral bore 74 with the cutout 20A aligned with the shank 12. Once the clip reaches the shank 12, it may be necessary to force the clip over the shank. In the process, the cutout 20A of the clip will expand so as to pass over the shank and once it has passed over the shank, it will close such that the clip 20 is securely retained on the shank between barbs 18. The clip 20 will further be wedged into the main bore 72 formed in the front panel. It will add additional security to the connection formed by the fastener 10. The presence of the clip 20 on the shank 12 of the fastener 10 will make it more difficult for the fastener to be backed out or otherwise removed from the bores 70 and 72.

Figure 4A:
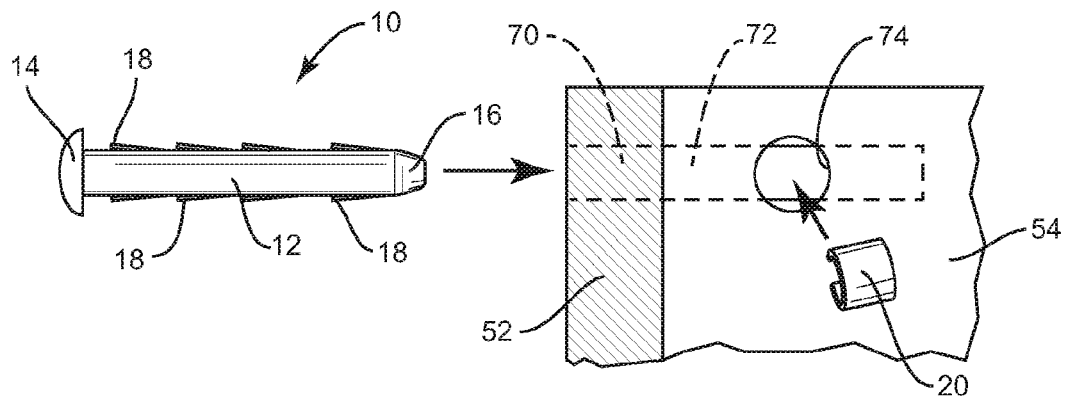
FIG. 4A is a fragmentary view of two components of a structure being secured together by the fastener.
Figure 4B:
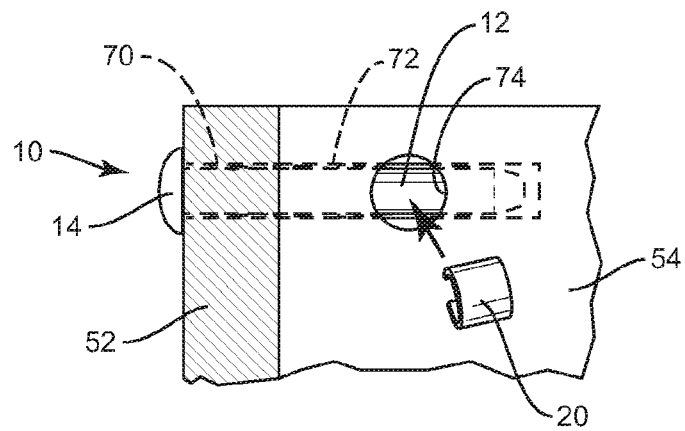
FIG. 4B is a view similar to FIG. 4A but showing the fastener inserted into two aligned bores of the two components.
Figure 4C:
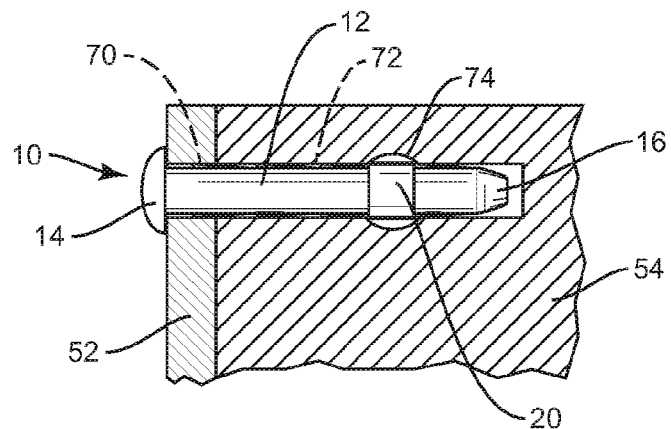
FIG. 4C is a fragmentary sectional view showing the fastener and associated clip securing the two components together.

In the case of the drawer assembly 50 shown herein, the fasteners 10 are used as illustrated in FIGS. 4A-4C to connect the sides 52 at four different joints to the front and back panels 54 and 56. In the example shown, there are two fasteners 10 utilized at each joint. The number of fasteners employed can vary, of course.

Figure 5:
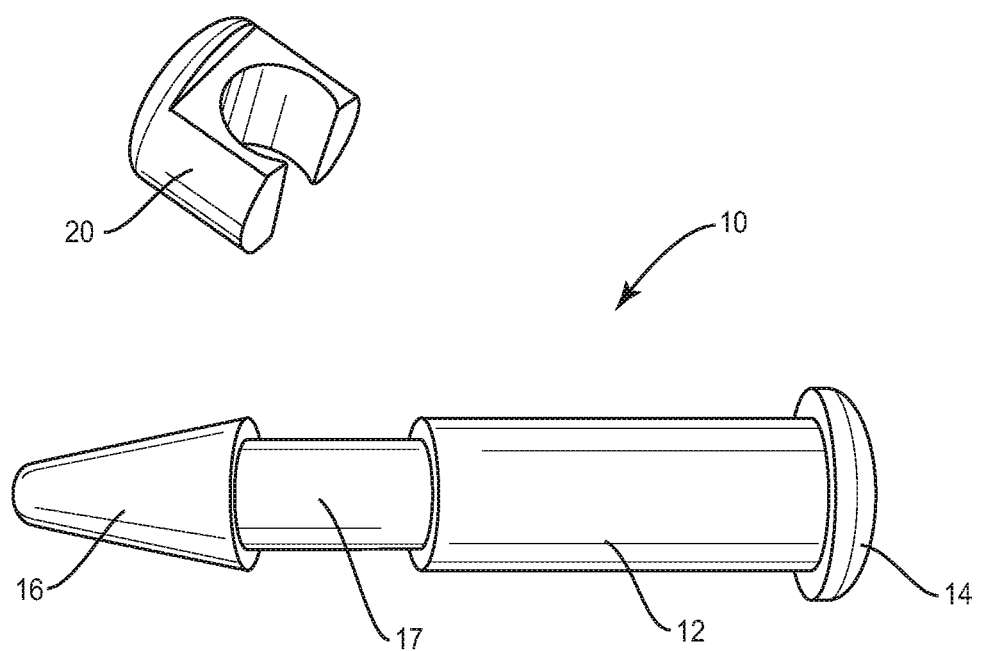
FIG. 5 is a view showing an alternative design for the fastener.

With particular reference to FIG. 5, an alternative view for the fastener 10 of the present invention is shown therein. As with the embodiment shown in FIGS. 1 and 2, the embodiment shown in FIG. 5 depicts a fastener 10 having a shank 12, head 14 and an insertion end portion 16. However, about the lower half portion of the shank 12 there is formed a circumferential cutout 17. This cutout 17 can extend completely around the shank 12 or only around a portion of the shank. The cutout 17 is designed to receive the clip 20. The clip 20 snaps around the cutout 17 to form a more secure connection between the fastener 10 and the two components or parts that it connects. In other words, the clip 20 serves the same function that is served by the clip shown in FIGS. 2, 4B and 4C.

The discussion appearing above shows the use of the fasteners 10 in connection with a drawer assembly that could be employed in a piece of furniture, a cabinet, a vanity, etc. It should be appreciated that the fasteners 10 can be utilized in other articles and pieces of furniture to connect two components, two panels or two structures together. The fasteners 10 are particularly useful in ready-to-assemble furniture because they enable a consumer or a retailer to easily and quickly assemble articles of furniture in such a way that the joints are firmly connected by the fasteners 10 and form structurally strong joints that are not likely to fail.

The present invention substantially improves the construction of fasteners and articles of furniture that employ the fastener of the present invention. The design of the fastener makes it easy for factories to manufacture and produce articles of furniture. Further, the design of the fastener and how the fastener is employed in furniture processes makes it easy for the consumer to assemble furniture designed to employ the fastener.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A drawer for a piece of furniture or cabinet structure, comprising:
    a plurality of panels including a front, sides, bottom and back;
    a fastener extending through two aligned openings in two of the panels for securing the two panels of the drawer together;
    the fastener including an elongated shank having first and second ends;
    a head formed on the first end of the shank;
    the second end of the shank forming an insert end that is configured to be inserted into and through the two aligned openings in the panels;
    a series of spaced apart barbs projecting outwardly from the shank and angled towards the head;
    wherein the barbs engage surrounding surfaces that form the openings in the two panels and provide a resistance that generally prevents the fastener from backing out of the two openings; and
    a clip inserted around the shank and wherein the clip encircles at least a portion of the shank and is disposed between at least two of the barbs.

2. The drawer of claim 1 wherein the barbs form an angle of less than 45° with the shank of the fastener.

3. The drawer of claim 1 wherein each side includes an inner surface, an outer surface, a front vertical edge, a rear vertical edge, a front vertical cutout formed in the inner side adjacent the front vertical edge and a rear vertical cutout formed in the inner surface adjacent the rear edge; the front including opposed vertical side edges; the back including opposed vertical side edges; wherein the vertical side edges of the front abut the front vertical cutouts in the sides; wherein the vertical side edges of the back abut the vertical rear cutouts in the sides; and wherein there is a plurality of the fasteners that extend through the sides into the vertical opposed side edges of the front and back.

4. The drawer of claim 1 wherein the clip comprises a sleeve having a surrounding wall with a slot cut out of the wall that permits the sleeve to be inserted around the shank of the fastener.

5. The drawer of claim 1 where at least one of the panels includes a lateral opening that intersects with at least one of the two aligned openings; and wherein the clip is aligned with the lateral opening.

6. The drawer of claim 5 wherein the clip surrounding the shank is wedged between the barbs and into one of the two aligned openings in the two panels, further securing the fastener in the two aligned openings of the two panels.

* * * * *